United States Patent
Cho (10) Patent No.: US 8,688,737 B2
(45) Date of Patent: Apr. 1, 2014

(54) METHOD AND APPARATUS FOR GENERATING AND REPRODUCING MEDIA OBJECT-BASED METADATA

(75) Inventor: Kyung-sun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 12/047,346

(22) Filed: Mar. 13, 2008

(65) Prior Publication Data

US 2009/0049084 A1   Feb. 19, 2009

(30) Foreign Application Priority Data

Aug. 13, 2007   (KR) .................. 10-2007-0081438

(51) Int. Cl.
*G06F 17/30*   (2006.01)

(52) U.S. Cl.
USPC .......................................................... 707/791

(58) Field of Classification Search
USPC .................... 707/700, 711, 791; 709/236
See application file for complete search history.

(56) References Cited

U.S. PATENT DOCUMENTS

| | | | |
|---|---|---|---|
| 6,785,688 B2 * | 8/2004 | Abajian et al. ................ | 707/700 |
| 2004/0098398 A1 | 5/2004 | Ahn et al. | |
| 2005/0175321 A1 | 8/2005 | Aridome et al. | |
| 2006/0149781 A1 | 7/2006 | Blankinship | |
| 2006/0167876 A1 | 7/2006 | Benitez et al. | |
| 2007/0162953 A1 | 7/2007 | Bolliger et al. | |

FOREIGN PATENT DOCUMENTS

| | | |
|---|---|---|
| EP | 1521472 A2 | 4/2005 |
| EP | 1684517 A2 | 7/2006 |
| JP | 2004-128938 A | 4/2004 |
| JP | 2004-133801 A | 4/2004 |
| JP | 2004-350251 A | 12/2004 |
| JP | 2005176306 A | 6/2005 |
| JP | 2006-197238 A | 7/2006 |
| KR | 1020040016566 A | 2/2004 |
| KR | 1020050111722 A | 11/2005 |
| KR | 1020070006905 A | 1/2007 |
| WO | 01/65832 A1 | 9/2001 |
| WO | 2006/034464 A1 | 3/2006 |
| WO | 2006/041260 A1 | 4/2006 |

OTHER PUBLICATIONS

Communication issued on Dec. 21, 2011 by the State Intellectual Property Office of the P.R. of China in the counterpart Chinese Patent Application No. 200880108031.1.
Carsten Herpel: "Elementary Stream Management in MPEG-4", IEEE Transactions on Circuits and Systems for Video Technology, IEEE Service Center, Piscataway, NJ, US, vol. 9, No. 2, Mar. 1, 1999, pp. 315-324, XP011014552, ISSN: 1051-8215.
Rudinei Goularte et al: "Context-aware support in structured documents for interactive-TV", Multimedia Systems, Springer, Berlin, DE, vol. 11, No. 4, Apr. 1, 2006, pp. 367-382, XP019349224, ISSN: 1432-1882, DOI: 10.1007/S00530-006-0014-4.

(Continued)

*Primary Examiner* — Huawen Peng
(74) *Attorney, Agent, or Firm* — Sughrue Mion, PLLC (57) ABSTRACT

A method and an apparatus for generating and reproducing media object-based metadata are provided. The method includes generating a media stream which includes media objects and generating metadata which corresponds to each of the media objects. Each of the media objects includes metadata position information for accessing the corresponding metadata. The method facilitates real-time reproduction and modification of content.

10 Claims, 6 Drawing Sheets

(56) References Cited

OTHER PUBLICATIONS

Communication from the Japanese Patent Office dated Feb. 5, 2013, in a counterpart application No. 2010-520922.
Communication from the European Patent Office issued Apr. 4, 2013 in counterpart European Application No. 08723402.7.
Communication, dated Oct. 9, 2012, issued by the Japanese Patent Office in counterpart Japanese Application No. 2010-520922.
Communication dated Oct. 28, 2013 issued by the Korean Intellectual Property Office in counterpart Korean Patent Application No. 1020070081438.
Communication dated Jan. 14, 2014 issued by the European Patent Office in counterpart European Patent Application No. 08723402.7.
"Information Technology—Coding of Audio-Visual Objects—Part 1: Systems," ISO/IEC 14496-1, 3rd Edition, Motion Picture Expert Group or ISO/IEC JTC1/SC29/WG11, No. N5277, Mar. 29, 2004, pp. i to 137 (152 pages total).

* cited by examiner

METHOD AND APPARATUS FOR GENERATING AND REPRODUCING MEDIA OBJECT-BASED METADATA

CROSS-REFERENCE TO RELATED PATENT APPLICATION

This application claims priority from Korean Patent Application No. 10-2007-0081438, filed on Aug. 13, 2007 in the Korean Intellectual Property Office, the disclosure of which is incorporated herein in its entirety by reference.

BACKGROUND OF THE INVENTION

1. Field of the Invention

Apparatuses and methods consistent with the present invention relate to generating and reproducing media object-based metadata, and more particularly, to generating and reproducing a media metadata framework which is suitable for real-time reproduction and modification of a multimedia object.

2. Description of the Related Art

As the manufacture and use of multimedia contents increase, a need to search for and filter multimedia contents has emerged, and various methods for encoding metadata have been suggested.

Metadata refers to data that briefly describes the contents and characteristics of information in a specific format in order to make it easy to search for and access information resources in various forms, i.e., information about the information resources.

Figure 1:
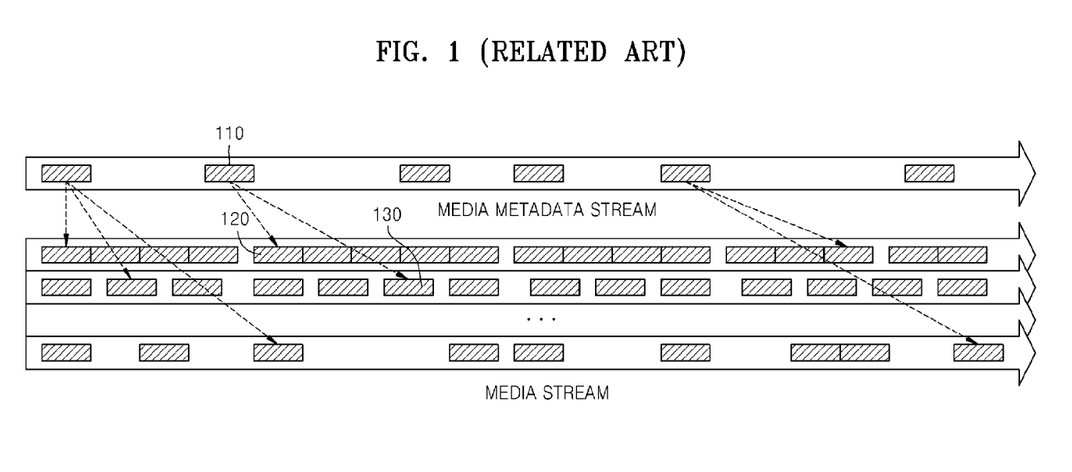
FIG. 1 illustrates a media file format or the structure of a media metadata framework in a moving picture experts group (MPEG)-2 system.

FIG. 1 illustrates a media file format or the structure of a media metadata framework in a moving picture experts group (MPEG)-2 system.

Referring to FIG. 1, a media metadata stream includes metadata 110. The metadata 110 includes profile information for decoding media objects 120 and 130 included in a media stream, and position information of the media objects 120 and 130.

Since the metadata 110 includes identifiers (IDs) or positions of the media objects (multimedia contents) 120 and 130, a user can easily access the media objects (multimedia contents) 120 and 130 by using the metadata 110.

In a multimedia system such as an MPEG-4 system, content is described on a scene basis, and metadata is configured separately for object description data and scene description data for a media stream.

However, in this scheme, the metadata is configured on a scene basis, making it difficult to modify or obtain only some of media objects of the content.

Moreover, since media objects can be accessed only by using the metadata, any loss in a metadata stream during content streaming may cause problems in configuring a scene.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for generating and reproducing media object-based metadata suitable for real-time reproduction and modification of multimedia content.

According to one aspect of the present invention, there is provided a method of generating media object-based metadata. The method includes generating a media stream which includes media objects and generating metadata which corresponds to each of the media objects, in which each of the media objects includes metadata position information for accessing the corresponding metadata.

The metadata may include object description data.

The metadata may further include object handling data.

The metadata position information may include position information of the object description data and position information of the object handling data.

The metadata position information may include an identifier (ID) of a first transport stream (TS) which includes the object description data, the position information of the object description data included in the first TS, an ID of a second TS which includes the object handling data, and the position information of the object handling data included in the second TS.

The method may further include generating a media object tree which describes a relational structure between the media objects and inserting the media object tree into a storage layer and a transport layer of the media stream.

According to another aspect of the present invention, there is provided a method of reproducing media object-based metadata. The method includes accessing a media object within a media stream, extracting metadata position information of metadata which corresponds to the media object from the media object, accessing the metadata based on the metadata position information, and reproducing the media object based on the metadata.

The accessing of the media object included in the media stream may include accessing the media object based on a media object tree within a storage layer or a transport layer of the media stream.

The method may further include deleting or modifying the media object and the metadata which corresponds to the media object.

According to another aspect of the present invention, there is provided an apparatus for generating media object-based metadata. The apparatus includes a media stream generation unit which generates a media stream which includes media objects, and a metadata generation unit which generates metadata which corresponds to each of the media objects, in which each of the media objects includes metadata position information for accessing the corresponding metadata.

According to another aspect of the present invention, there is provided an apparatus for reproducing media object-based metadata. The apparatus includes an access unit which accesses a media object within a media stream and which accesses the metadata based on metadata position information, an extraction unit which extracts the metadata position information of metadata which corresponds to the media object from the media object, and a reproduction unit which reproduces the media object based on the metadata.

According to another aspect of the present invention, there is provided a transport stream structure of a media object-based metadata. The transport stream structure includes a media stream which includes media objects and a metadata stream which includes metadata which corresponds to each of the media objects, in which each of the media objects includes metadata position information for accessing the corresponding metadata.

According to another aspect of the present invention, there is provided a computer-readable recording medium having recorded thereon a program for executing a method of generating media object-based metadata, the method including generating a media stream which includes media objects and generating metadata which corresponds to each of the media objects, in which each of the media objects includes metadata position information for accessing the corresponding metadata.

According to another aspect of the present invention, there is provided a computer-readable recording medium having recorded thereon a program for executing a method of reproducing media object-based metadata, the method including accessing a media object within a media stream, extracting metadata position information of metadata which corresponds to the media object from the media object, accessing the metadata based on the metadata position information, and reproducing the media object based on the metadata.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings. It should be noted that like reference numerals refer to like elements illustrated in one or more of the drawings. In the following description of the present invention, a detailed description of known functions and configurations incorporated herein will be omitted for conciseness and clarity.

Figure 2:
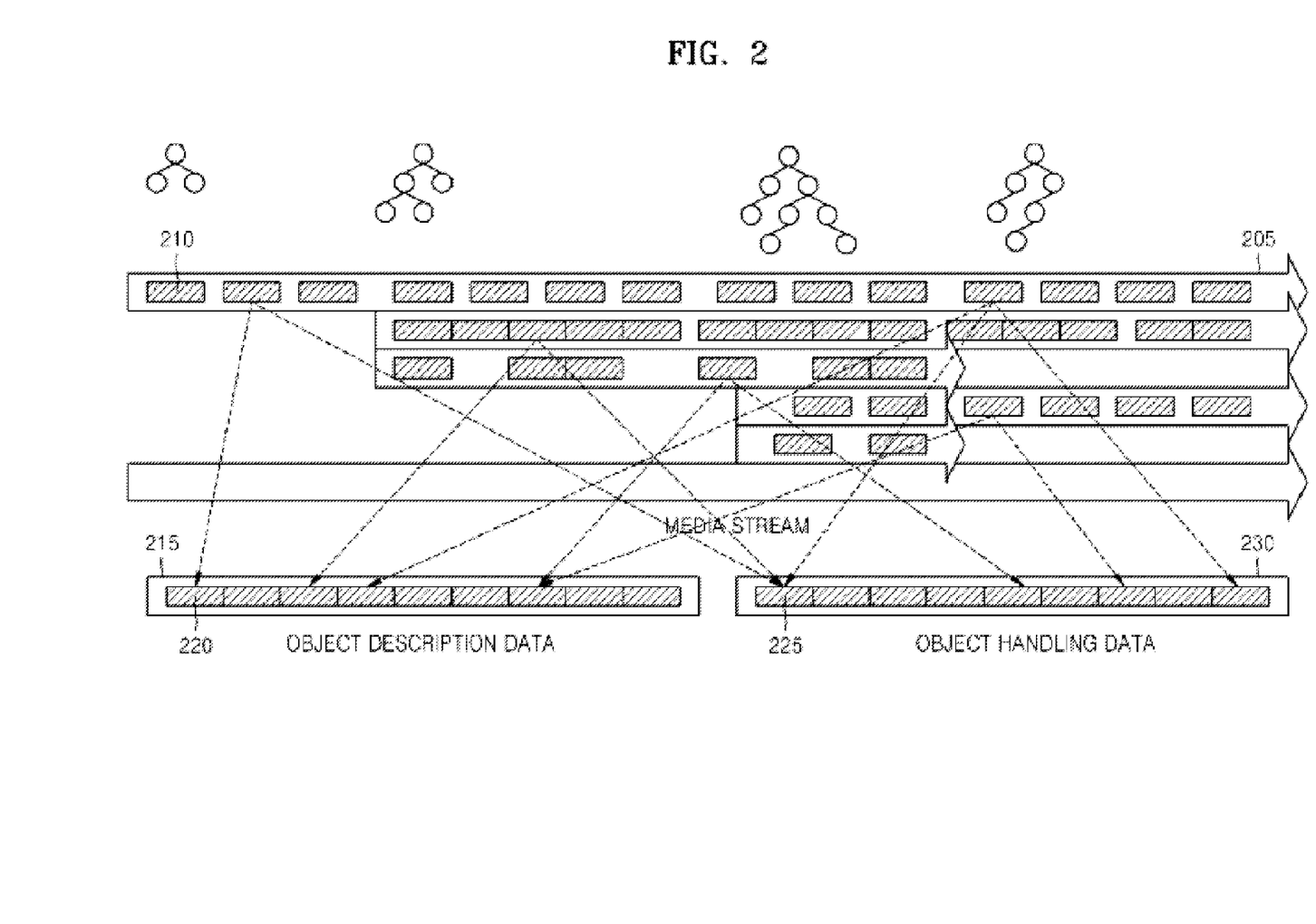
FIG. 2 illustrates an example of application for storing a media metadata framework generated according to an exemplary embodiment of the present invention.

FIG. 2 illustrates an example of application for storing a media metadata framework generated according to an exemplary embodiment of the present invention.

Referring to FIG. 2, the media metadata framework includes a media stream 205 and metadata streams 215 and 225.

The media stream 205 includes media objects 210. Herein, a media object is an audio frame, a video frame, or an image frame. While the media stream is generally a continuous flow of media objects, the media stream should be construed as including a form in which the media objects are stored in a storage device as illustrated in FIG. 2 herein.

The media objects 210 are described independently for each media object without including a description about a relational structure between the media objects 210 (of the media stream 205), such as scenes therein.

The relational structure between the media objects 210 (of the media stream 205), such as encoding, content configuration, and the order of rendering, can be defined using a media object (media stream) tree.

The media object tree describes the relational structure, such as encoding, multiplexing, and a meaningful relationship between the media objects 210 using a data structure like a tree structure. For example, an MPEG-4 system can be implemented to configure an object tree over time in an object descriptor (OD) framework.

In exemplary embodiments of the present invention, the media object tree is inserted into a storage layer or a transport layer of a media stream to be stored or transmitted. In other words, the media object tree is not included in object handling data to be described later.

The media objects 210 include their corresponding metadata 220 and 230. The metadata 220 and 230 are included in the metadata streams 215 and 225, including storage structures.

The metadata 220 and 230 briefly describe the contents and characteristics of various information in a specific format in order to facilitate access to the various information. The metadata 220 and 230 may be object description data 220 and object handling data 230. The object description data 220 is media metadata information which includes profile information, such as decoding information of the media objects 210, and the object handling data 230 renders metadata information, including information such as the rendering position or transformation of the media objects 210.

The media objects 210 include the position information of the metadata 220 and 230 such as the object description data 220 and the object handling data 230. The position information allows easy access to the metadata 220 and 230 from the media objects 210. Thus, a predetermined access device accesses the media objects 210 of the media stream 205, and then accesses the metadata 220 and 230 corresponding to the media objects 210 by using the position information included in the media objects 210.

Since such a media object-based metadata framework forms metadata based on media objects, a relationship between media objects of content can be reduced. Thus, it is possible to easily find metadata for modification of only some of the media objects.

Moreover, according to the media object-based metadata framework, when some streams or packets of content are lost, only the lost media objects can be discarded, thereby improving the performance of content reproduction.

Figure 3:
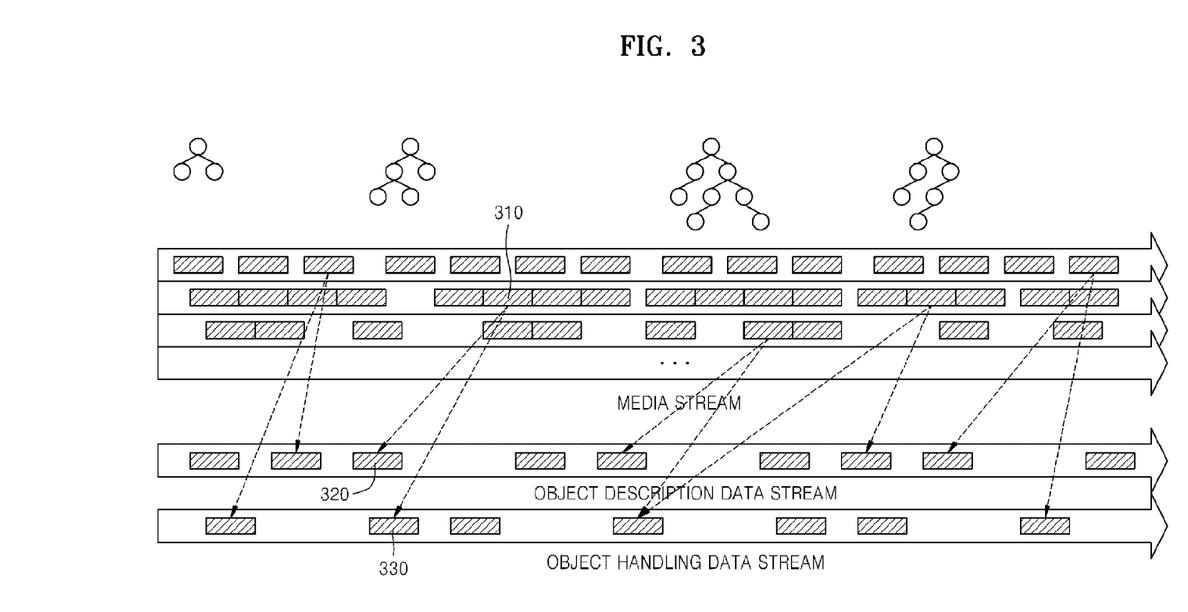
FIG. 3 illustrates a transport structure of a media metadata framework generated according to an exemplary embodiment of the present invention.

FIG. 3 illustrates a transport structure of a media metadata framework generated according to a modified embodiment of the present invention.

Referring to FIG. 3, metadata position information included in a media object 310 may include an identifier (ID) of a transport stream (TS) which includes object description data 320, position information of the object description data 320 included in the TS, an ID of a TS which includes object handling data 330, and position information of the object handling data 330 included in the TS.

The media object 310, the object description data 320, and the object handling data 330 are similar to those described in FIG. 2 and thus will not be described in detail.

Figure 4:
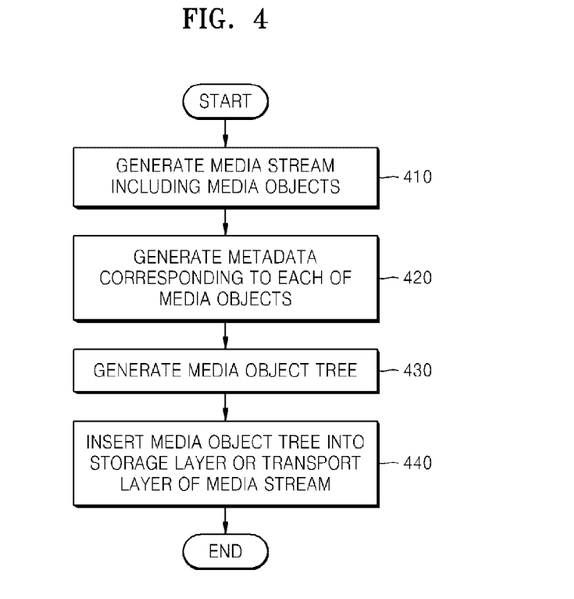
FIG. 4 is a flowchart illustrating a method of generating media object-based metadata according to an exemplary embodiment of the present invention.

FIG. 4 is a flowchart illustrating a method of generating media object-based metadata according to an exemplary embodiment of the present invention.

Referring to FIG. 4, in operation 410, a media stream which includes media objects is generated. The media objects include metadata position information for accessing metadata. According to a modified exemplary embodiment of the present invention, the media objects may include metadata position information and the metadata may include position information for accessing the media objects.

In operation 420, metadata and a metadata stream are generated. Each of the media objects has its corresponding metadata.

The metadata includes object description data, and preferably object handling data. Thus, the media objects include position information of the object description data, and may also include position information of the object handling data. In an example of application for transport of the metadata stream according to a modified exemplary embodiment of the present invention, the metadata position information included in the media objects may include an ID of a TS which includes the object description data, position information of the object description data, an ID of a TS which includes the object handling data, and position information of the object handling data.

In operation 430, a media object tree for describing the relational structure between the media objects is generated.

In operation 440, the media object tree is inserted into a storage layer or a transport layer of the media stream. While generation of the media stream and the metadata is performed in an application layer, insertion of the media object tree may be performed in the storage layer or the transport layer.

Figure 5:
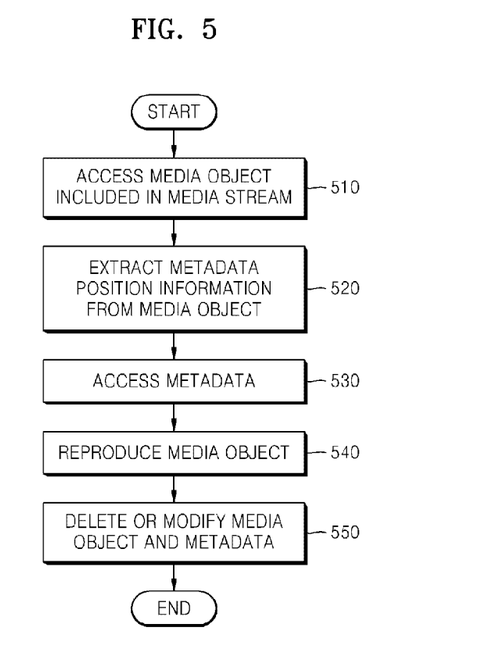
FIG. 5 is a flowchart illustrating a method of reproducing media object-based metadata according to an exemplary embodiment of the present invention.

FIG. 5 is a flowchart illustrating a method of reproducing media object-based metadata according to an exemplary embodiment of the present invention.

Referring to FIG. 5, in operation 510, an apparatus for reproducing media object-based metadata accesses media objects included in a media stream. The access to the media objects can be made based on a relation structure between the media objects, which is described in a media object tree included in a storage layer or a transport layer of the media stream.

In operation 520, position information of metadata corresponding to the media objects is extracted from the media objects.

In operation 530, access to the metadata is made based on the extracted position information.

In operation 540, the media objects are reproduced based on decoding information and rendering information recorded in the accessed metadata. The decoding information must have been recorded in the metadata, but the rendering information does not have to have been recorded in the metadata.

In operation 550, when deletion or modification of a portion of content is requested from an external device, a corresponding media object and metadata corresponding to the media object are deleted or modified.

Figure 6:
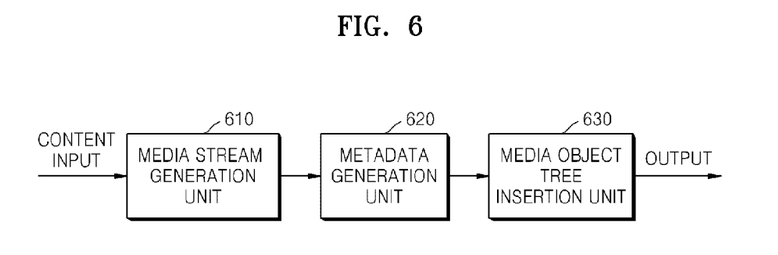
FIG. 6 is a block diagram of an apparatus for generating media object-based metadata according to an exemplary embodiment of the present invention.

FIG. 6 is a block diagram of an apparatus for generating media object-based metadata according to an exemplary embodiment of the present invention.

Referring to FIG. 6, the apparatus includes a media stream generation unit 610, a metadata generation unit 620, and a media object tree insertion unit 630.

The media stream generation unit 610 receives content and generates a media stream which includes media objects. The media stream generation unit 610 inserts metadata position information for accessing metadata into the media objects. The metadata and the metadata position information have already been described.

The metadata generation unit 620 generates metadata regarding the media objects of the media stream generated in the media stream generation unit 610, and outputs the media stream and the metadata.

The media object tree insertion unit 630 generates a media object tree for describing a relational structure between the media objects, and inserts the generated media object tree into a storage layer or a transport layer of the media stream.

Figure 7:
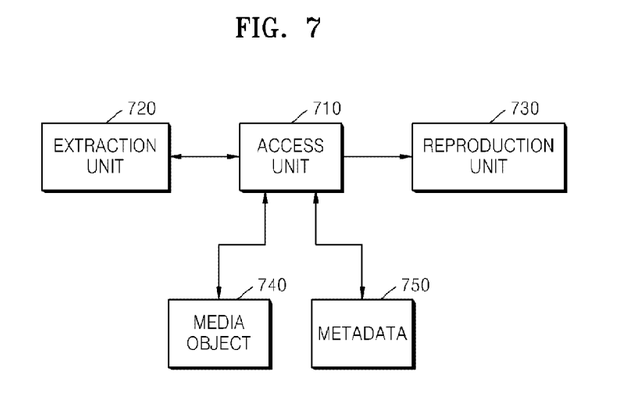
FIG. 7 is a block diagram of an apparatus for reproducing media object-based metadata according to an exemplary embodiment of the present invention.

FIG. 7 is a block diagram of an apparatus for reproducing media object-based metadata according to an exemplary embodiment of the present invention.

Referring to FIG. 7, the apparatus includes an access unit 710, an extraction unit 720, and a reproduction unit 730.

The access unit 710 accesses and reads a media object 740 included in a media stream. The access unit 710 outputs the read media object 740 to the extraction unit 720. The access unit 710 also accesses and reads metadata 750 based on metadata position information received from the extraction unit 720. The read media object 740 and metadata 750 are output to the reproduction unit 730.

The extraction unit 720 receives the media object 740 from the access unit 710 and extracts the metadata position information from the received media object 740. The extraction unit 720 outputs the extracted metadata position information to the access unit 710.

The reproduction unit 730 reproduces the desired content using the media object 740 and the metadata 750 output from the access unit 710.

Exemplary embodiments of the present invention can be applied to media metadata framework standards, such as the MPEG-4 system (ISO/IEC 14496-1) and the MPEG-4 LASeR/SAF (ISO/IEC 14496-20). Exemplary embodiments of the present invention can also be applied to media data storage format standards, such as the ISO base media file format (ISO/IEC 14496-12), QuickTime (Apple Corps Ltd.), and ASF (Microsoft Corporation). Exemplary embodiments of the present invention can also be applied to media processing terminals supporting the above-described media system techniques, such as televisions (TVs), set top boxes (STBs), portable media players (PMPs), MP3 players, mobile broadcasting terminals, cellular phones, and software media players.

The present invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to exemplary embodiments of the present invention, real-time reproduction and modification of content can be facilitated, and a media object included in the content can be easily accessed and obtained.

Moreover, the robustness of a content structure against a loss of some data of the content can be improved, and only a desired media object of the content can be selectively reproduced.

While the present invention has been particularly shown and described with reference to exemplary embodiments thereof, it will be understood by those of ordinary skill in the art that various changes in form and detail may be made therein without departing from the spirit and scope of the present invention as defined by the following claims and their legal equivalents.

What is claimed is:

1. A method of generating media object-based metadata, the method comprising:
generating a first media stream which comprises media objects; and
generating a metadata stream comprising metadata which correspond to each of the media objects;
generating a media object tree which describes a relational structure between the media objects; and
inserting the media object tree into one of a storage layer and a transport layer of the first media stream,
wherein each of the media objects comprises metadata position information of the metadata, wherein the metadata position information of the metadata indicates a position of the metadata in the metadata stream,
wherein the metadata comprises object description data and object handling data,
wherein the metadata stream comprises a first transport stream and a second transport stream, and
wherein the metadata position information of the metadata comprises an identifier of the first transport stream which comprises the object description data, position information of the object description data, an identifier of the second transport stream which comprises the object handling data, and position information of the object handling data.

2. The method of claim 1, wherein the metadata position information comprises position information of the object description data and position information of the object handling data.

3. The method of claim 1, wherein the first media stream is a packetized media stream of packets including the media objects.

4. A method of reproducing media object-based metadata, the method comprising:
accessing a media object included within a first media stream,
extracting metadata position information of metadata from the media object, wherein a metadata stream comprises metadata which corresponds to the media object, and wherein the metadata position information of the metadata indicates a position of the metadata in the metadata stream;
accessing the metadata based on the metadata position information; and
reproducing the media object based on the metadata,
wherein the metadata comprises object description data and object handling data,
wherein the metadata stream comprises a first transport stream and a second transport stream,
wherein the metadata position information of the metadata comprises an identifier of the first transport stream which comprises the object description data, position information of the object description data, an identifier of the second transport stream which comprises the object handling data, and position information of the object handling data, and
wherein the accessing the media object comprises accessing the media object based on a media object tree within a storage layer or a transport layer of the first media stream.

5. The method of claim 4, further comprising deleting or modifying the media object and the metadata which corresponds to the media object.

6. The method of claim 4, wherein the metadata position information comprises position information of the object description data and position information of the object handling data.

7. An apparatus for generating media object-based metadata, the apparatus comprising:
a processor, the processor functioning as: a media stream generation unit which generates a first media stream which comprises media objects;
a metadata generation unit which generates a metadata stream comprising metadata which correspond to each of the media objects; and
a media object tree insertion unit which generates a media object tree which describes a relational structure between the media objects, and which inserts the media object tree into a storage layer or a transport layer of the first media stream,
wherein each of the media objects comprises metadata position information of the metadata, wherein the metadata position information of the metadata indicates a position of the metadata in the metadata stream,
wherein the metadata comprises object description data and object handling data,
wherein the metadata stream comprises a first transport stream and a second transport stream, and
wherein the metadata position information of the metadata comprises an identifier of the first transport stream which comprises the object description data, position information of the object description data, an identifier of the second transport stream which comprises the object handling data, and position information of the object handling data.

8. An apparatus for reproducing media object-based metadata, the apparatus comprising:
a processor, the processor functioning as:
an access unit which accesses a media object within a first media stream and which accesses the metadata based on metadata position information based on a media object tree within a storage layer or a transport layer of the first media stream;
an extraction unit which extracts position information of metadata from the media object, wherein a metadata stream comprises metadata which corresponds to the media object, and wherein the metadata position information of the metadata indicates a position of the metadata in the metadata stream; and
a reproduction unit which reproduces the media object based on the metadata,
wherein the metadata comprises object description data and object handling data,
wherein the metadata stream comprises a first transport stream and a second transport stream, and
wherein the metadata position information of the metadata comprises an identifier of the first transport stream which comprises the object description data, position information of the object description data, an identifier of the second transport stream which comprises the object handling data, and position information of the object handling data.

9. A non-transitory computer-readable recording medium having recorded thereon a program for executing a method of generating media object-based metadata, the method comprising:
generating a first media stream which comprises media objects; and
generating a metadata stream comprising metadata which correspond to each of the media objects;

generating a media object tree which describes a relational structure between the media objects; and inserting the media object tree into one of a storage layer and a transport layer of the first media stream, wherein each of the media objects comprises metadata position information of the metadata, wherein the metadata position information of the metadata indicates a position of the metadata in the metadata stream, wherein the metadata comprises object description data and object handling data, wherein the metadata stream comprises a first transport stream and a second transport stream, and wherein the metadata position information of the metadata comprises an identifier of the first transport stream which comprises the object description data, position information of the object description data, an identifier of the second transport stream which comprises the object handling data, and position information of the object handling data.

10. A non-transitory computer-readable recording medium having recorded thereon a program for executing a method of reproducing media object-based metadata, the method comprising:

accessing a media object included within a first media stream;

extracting metadata position information of metadata from the media object, wherein a metadata stream comprises metadata which corresponds to the media object, and wherein the metadata position information of the metadata indicates a position of the metadata in the metadata stream;

accessing the metadata based on the metadata position information; and reproducing the media object based on the metadata, wherein the metadata comprises object description data and object handling data, wherein the metadata stream comprises a first transport stream and a second transport stream, and wherein the metadata position information of the metadata comprises an identifier of the first transport stream which comprises the object description data, position information of the object description data, an identifier of the second transport stream which comprises the object handling data, and position information of the object handling data, and wherein the accessing the media object comprises accessing the media object based on a media object tree within a storage layer or a transport layer of the first media stream.

* * * * *